(12) United States Patent
Takizawa

(10) Patent No.: US 7,143,872 B2
(45) Date of Patent: Dec. 5, 2006

(54) APPARATUS FOR RETAINING A BICYCLE DISK BRAKE ROTOR TO A BICYCLE WHEEL HUB

(75) Inventor: Shinichi Takizawa, Izumisano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/905,246

(22) Filed: Dec. 22, 2004

(65) Prior Publication Data
US 2005/0139432 A1 Jun. 30, 2005

(30) Foreign Application Priority Data
Dec. 26, 2003 (JP) .............................. 2003-433962

(51) Int. Cl.
B62L 5/00 (2006.01)
B60T 1/06 (2006.01)

(52) U.S. Cl. ....................... 188/26; 188/18 A

(58) Field of Classification Search .................. 188/26, 188/18 A
See application file for complete search history.

(56) References Cited

U.S. PATENT DOCUMENTS

| 6,095,291 | A | * | 8/2000 | Bertetti et al. | ............ 188/18 A |
| 6,371,252 | B1 | * | 4/2002 | Kanehisa | ...................... 188/26 |
| 6,854,569 | B1 | * | 2/2005 | Chen | ........................... 188/26 |
| 2003/0000779 | A1 | * | 1/2003 | Kanehisa | ...................... 188/19 |
| 2003/0151300 | A1 | * | 8/2003 | Goss et al. | ............... 301/110.5 |
| 2004/0165805 | A1 | * | 8/2004 | Kanehisa et al. | ........... 384/545 |

* cited by examiner

Primary Examiner—Robert A. Siconolfi
(74) Attorney, Agent, or Firm—James A. Deland

(57) ABSTRACT

A disk brake apparatus comprises a disk brake rotor, a fastener structured to screw onto a threaded surface of a bicycle wheel hub so that the disk brake rotor is disposed between the fastener and the hub, and a rotation inhibiting structure disposed on the disk brake rotor to inhibit relative rotation between the fastener and the disk brake rotor.

9 Claims, 11 Drawing Sheets

APPARATUS FOR RETAINING A BICYCLE DISK BRAKE ROTOR TO A BICYCLE WHEEL HUB

BACKGROUND OF THE INVENTION

The present invention is directed to bicycles and, more particularly, to an apparatus for retaining a bicycle disk brake rotor to a bicycle wheel hub.

Cycling has gained widespread acceptance not only as a means of transportation but also as a form of recreation. In fact, both amateur and professional bicycle racing has become extremely popular. As a result of these factors, the bicycle industry is constantly making improvements to various bicycle parts, whether they are used in bicycles for recreation, transportation, or racing. Bicycle braking systems in particular have undergone wide-ranging redesigns over the past few years.

Several types of bicycle braking devices are available on the market. Such devices include rim brakes, caliper brakes, disk brakes, and other general bicycle braking devices. Disk brake systems usually are the braking systems of choice when the rider requires a very high-performance braking system. That is because disk brake systems confer a very large amount of control relative to the force of operation applied to the brake lever, and they generally are very robust under any weather or riding condition.

Disk brake systems normally comprise a caliper connected to the bicycle frame, a brake lever attached to the bicycle handlebar for operating the caliper, and a disk brake rotor securely connected to the bicycle wheel hub. Several different methods are used for connecting the disk brake rotor to the wheel hub. In one method, the disc brake rotor is attached to an adapter, the adapter is attached to the hub, and then a fastener in the form of a lock ring is screwed onto the hub in order to secure the disc brake rotor assembly to the hub. Unfortunately, the lock ring can rotate relative to the hub after long years of use, vibration, etc., thereby possibly loosening the disc brake rotor assembly, even though the lock ring was tightly screwed onto the hub.

One attempt to solve the problem is disclosed in Japanese Unexamined Patent Application Publication No. 2003-136903. In that publication, serrations are formed on the face of the lock ring that contacts the disc brake rotor to help prevent loosening of the lock ring. While such a bicycle disc brake rotor assembly derives a certain anti-loosening effect due to the serrations formed on the lock ring, the contacted surface of the neighboring disc brake rotor is substantially flat, so the anti-loosening effect is inadequate.

SUMMARY OF THE INVENTION

The present invention is directed to various features of a bicycle disk brake apparatus. In one embodiment, a disk brake apparatus comprises a disk brake rotor, a fastener structured to screw onto a threaded surface of a bicycle wheel hub so that the disk brake rotor is disposed between the fastener and the hub, and a rotation inhibiting structure disposed on the disk brake rotor to inhibit relative rotation between the fastener and the disk brake rotor. Additional inventive features will become apparent from the description below, and such features alone or in combination with the above features may form the basis of further inventions as recited in the claims and their equivalents.

BRIEF DESCRIPTION OF THE DRAWINGS

FIG. 1 is a side view of a particular embodiment of a bicycle;

FIG. 2 is a view of relevant components for a front disk brake system;

FIG. 3 is a view of relevant components for a rear disk brake system;

FIG. 4 is an exploded view of particular embodiments of disk brake components associated with a wheel hub;

FIG. 5 is a more detailed view of the wheel hub shown in FIG. 4;

FIG. 6 is a more detailed view of the rotor attachment boss shown in FIG. 4;

FIG. 7 is a more detailed view of the disk brake rotor shown in FIG. 4;

FIG. 8 is a more detailed view of the securing ring shown in FIG. 4;

FIG. 9 is a view of the disk brake rotor attached to the wheel hub;

FIG. 10 is an exploded view of further embodiments of disk brake components associated with a wheel hub;

FIG. 11 is a rear side view of another embodiment of a disk brake rotor; and FIG. 12 is a front side view of the disk brake rotor shown in FIG. 12.

DETAILED DESCRIPTION OF THE EMBODIMENTS

FIG. 1 is a side view of a particular embodiment of a bicycle 10. Bicycle 10 comprises a frame 14, a front wheel 13 rotatably connected to a front fork of frame 14 through a front disk brake hub 12, a rear wheel 13' rotatably connected to the rear portion of frame 14 through a rear disk brake hub 12', a seat 17 adjustably connected to frame 14, handlebars 18 connected to the front fork for rotating front wheel 13, and a drive train 19 for propelling the bicycle 10. A plurality of spokes 24 extend outwardly from the front and rear disk brake hubs 12 and 12', wherein the outer ends of spokes 24 are fastened to a rim 25 with spoke nipples (not shown) in a conventional manner. A tire 26 is disposed on the outer circumference of each rim 25. Bicycle 10 and its various parts are well known, so a description thereof shall be omitted, except for the components comprising the front and rear disk brake hubs 12 and 12'. Other components such as other brakes, derailleurs, additional sprockets, etc. may be used with bicycle 10.

As shown in FIGS. 2 and 3, bicycle 10 further comprises front and rear disk brake assemblies 20 and 20', respectively. Each disk brake assembly 20 and 21' comprises a caliper 21 mounted to the front fork or frame 14, respectively, a brake lever 22 mounted to handlebar 18, and a disk brake rotor 23 mounted to its associated hub 12 or 12'. Since the disk brake assemblies 20 and 20' are substantially the same, only the relevant components of disk brake assembly 20 shall be described further.

FIG. 4 is an exploded view of particular embodiments of disk brake components associated with wheel hub 12. In general, disk brake rotor 23 is detachably and nonrotatably connected to disk brake hub 12 using an adapter in the form of a rotor attachment boss 28, and a fastener in the form of a securing ring 29 that screws to hub 12. Disk brake rotor 23, rotor attachment boss 28 and securing ring 29 comprise a disk brake rotor assembly 8. Rotor attachment boss 28 retains disk brake rotor 23 to hub 12 without requiring rivets or bolts.

Figure 1:
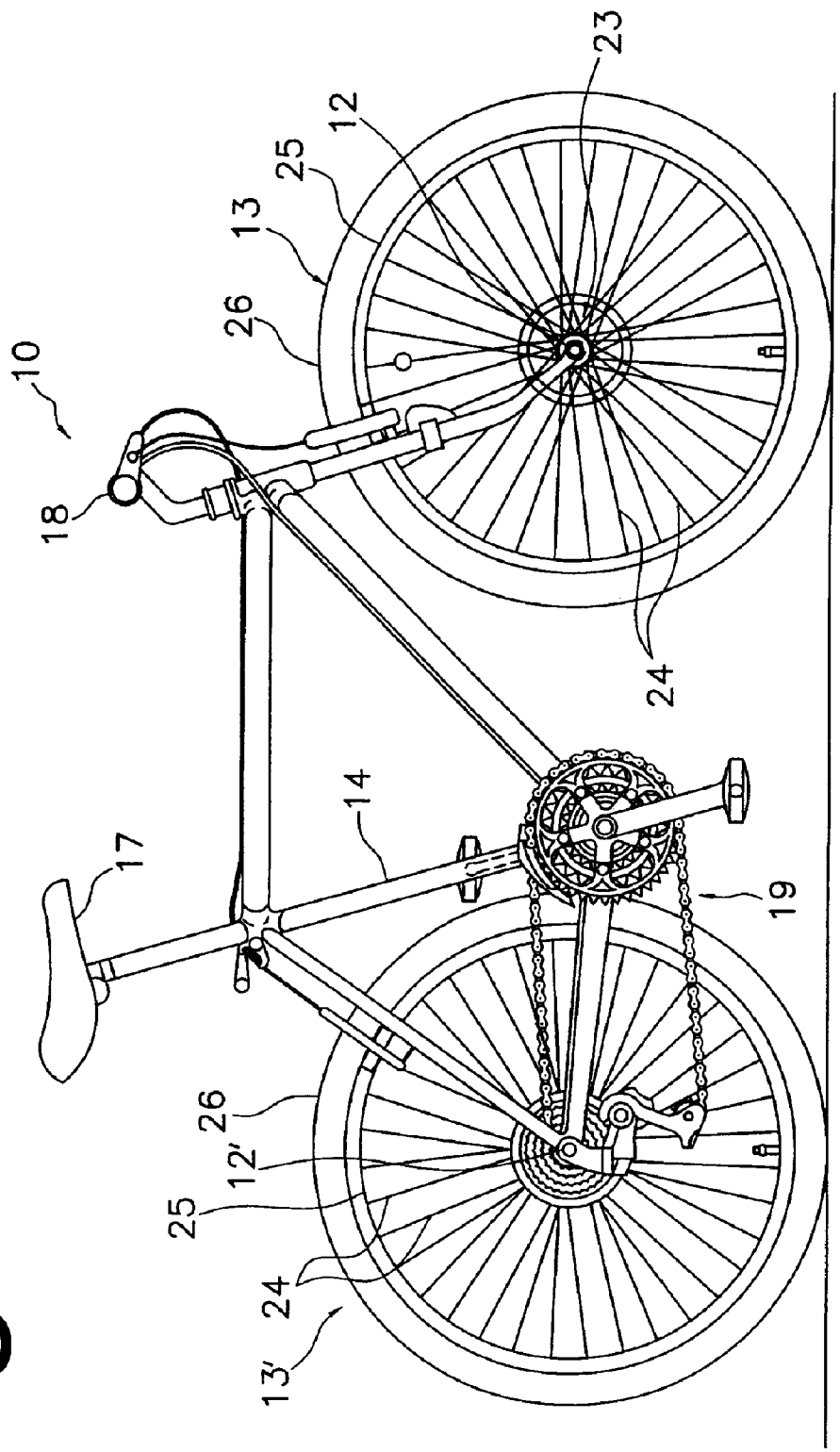
Figure 2:
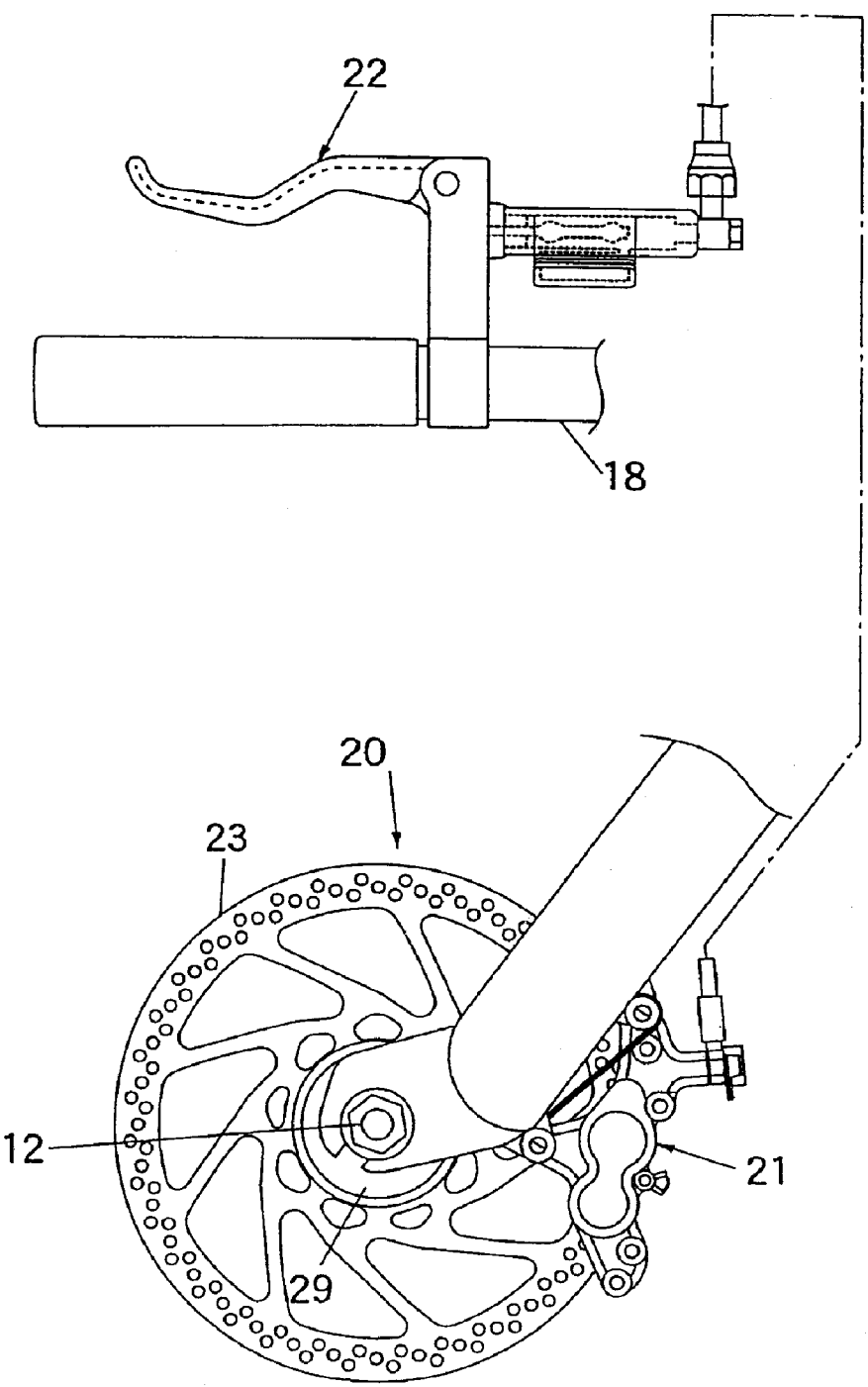
Figure 3:
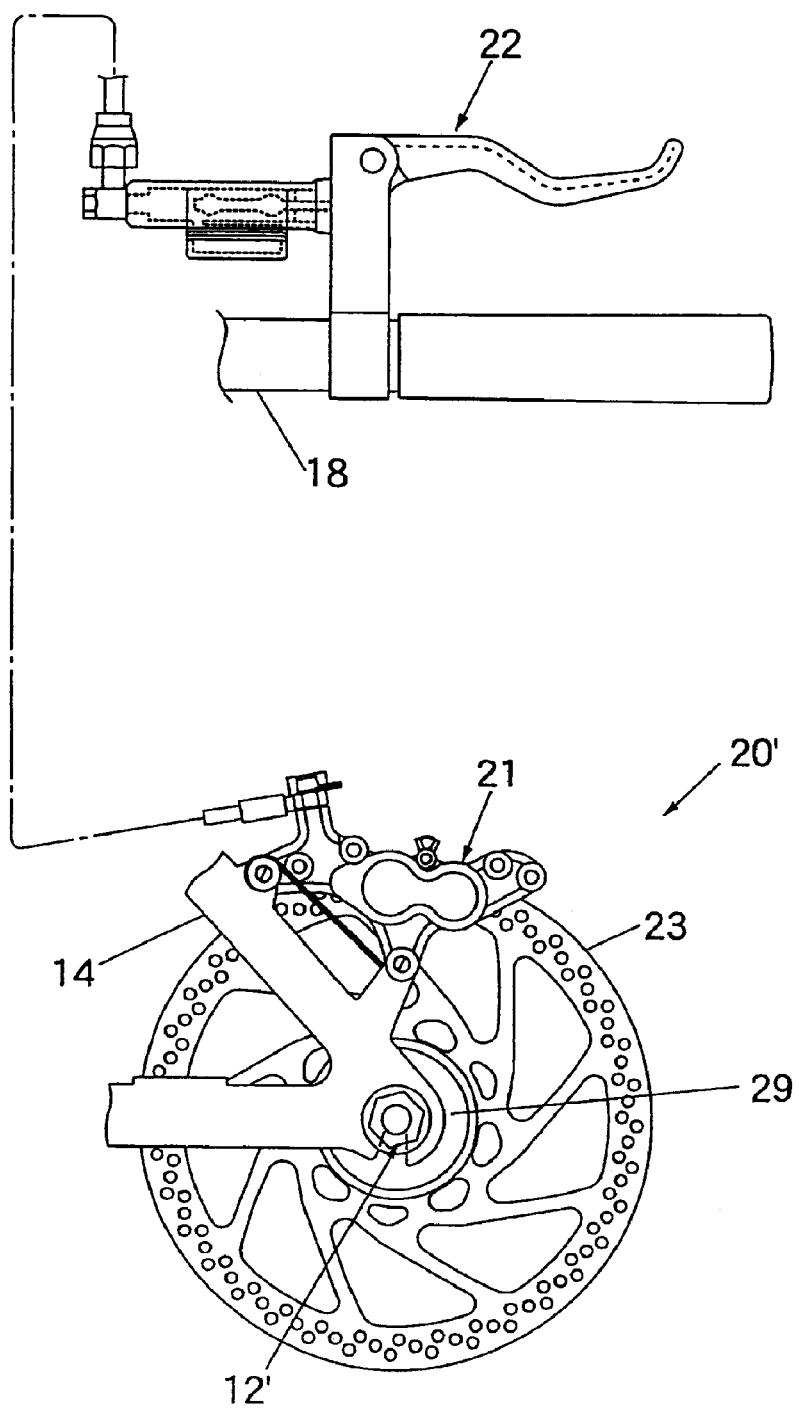
Figure 4:
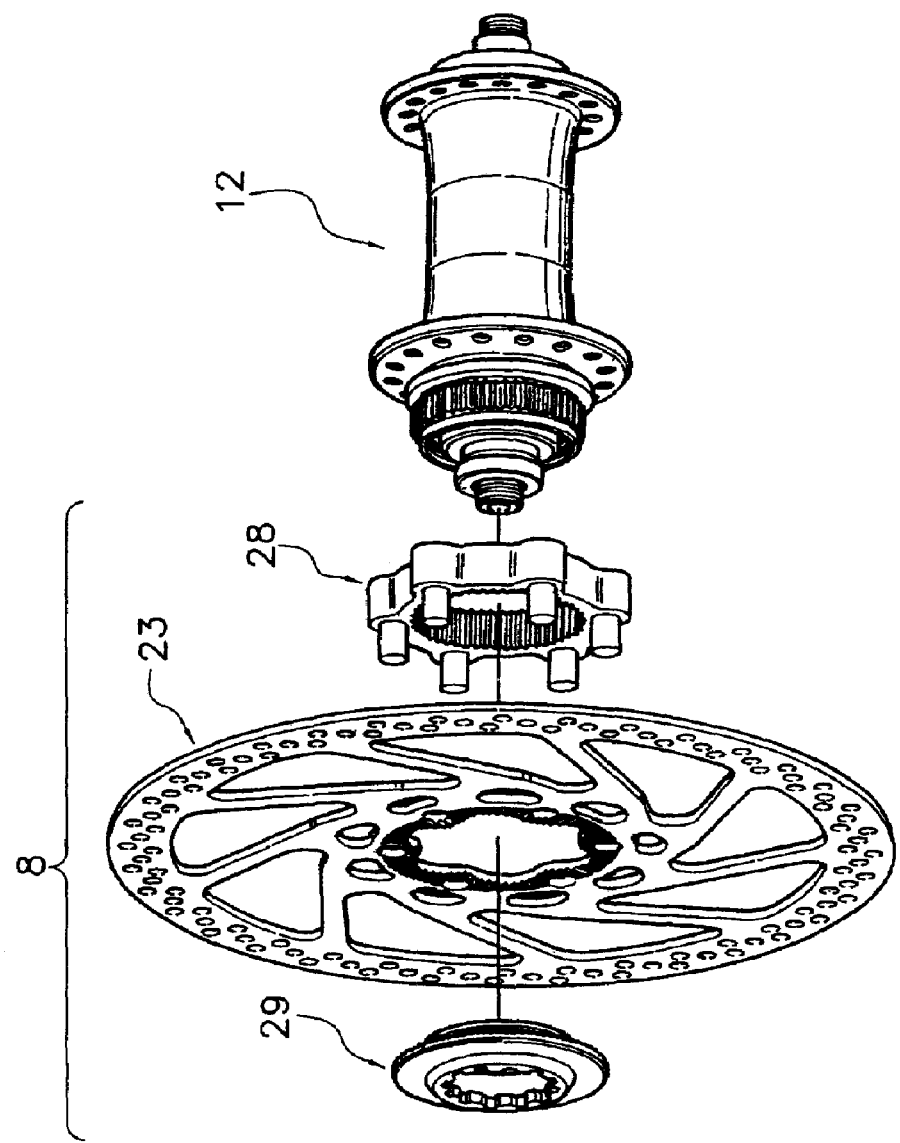
Figure 5:
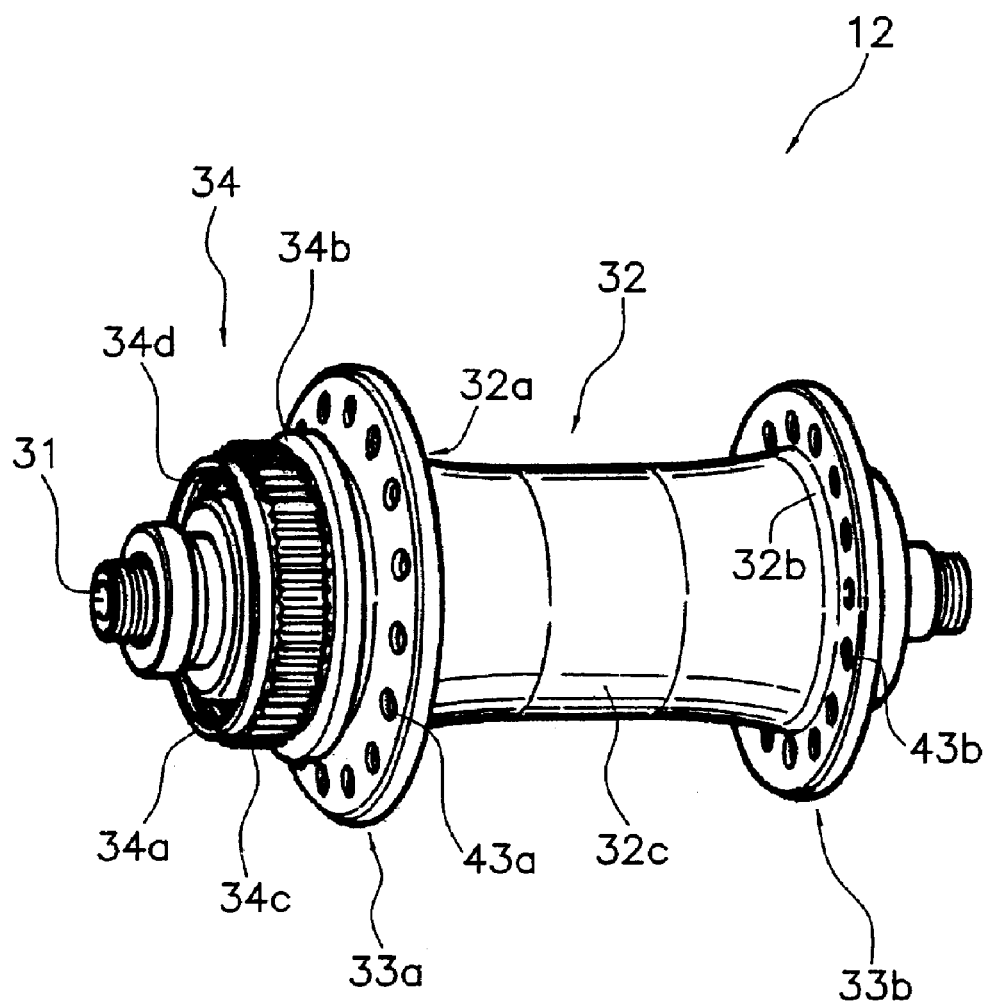

Front disk brake hub 12 is nearly identical to rear disk brake hub 12' except that it lacks a freewheel. As shown in FIG. 5, disk brake hub 12 comprises a hub axle 31, a hub shell 32 rotatably supported on hub axle 31 in a conventional manner, a first spoke connecting flange 33a, a second spoke connecting flange 33b, and a brake rotor attachment unit 34. First and second spoke connecting flanges 33a and 33b and brake rotor attachment unit 34 are formed as a unified part with hub shell 32.

First spoke connecting flange 33a is an annular spoke flange disposed on hub shell 32 at a first hub shell end 32a of hub shell 32. A plurality of first spoke openings 43a are formed circumferentially equidistant in first spoke connecting flange 33a for receiving the curved ends of each of a plurality of the spokes 24. Similarly, second spoke connecting flange 33b is an annular spoke flange disposed on hub shell 32 at a second hub shell end 32b of hub shell 32. A plurality of second spoke openings 43b are formed circumferentially equidistant in second spoke connecting flange 33b for receiving the curved ends of each of another plurality of spokes 24. As a result, the spokes 24 extend radially outwardly in a circumferential manner.

Brake rotor attachment unit 34 is disposed at first hub shell end 32a of hub shell 32 adjacent to first spoke connecting flange 33a. Brake rotor attachment unit 34 comprises a tubular member 34a and an annular adjoining flange 34b extending radially outwardly from tubular member 34a. Tubular member 34a has an outer peripheral surface defining a plurality of male splines 34c and an inner peripheral surface defining a female threaded portion 34d.

Figure 6:
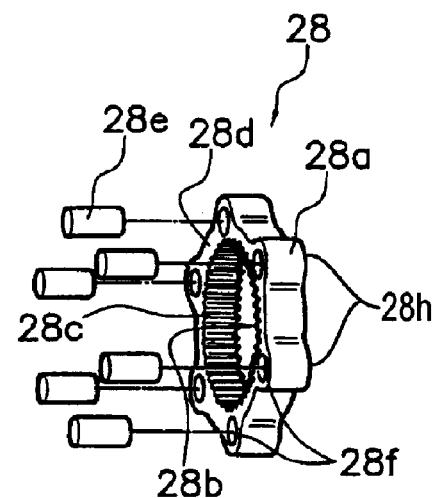

As shown in FIG. 6, rotor attachment boss 28 comprises an annular base member 28a with a center opening 28b, wherein the inner peripheral surface of center opening 28b defines a plurality of female splines 28c. Splines 28c are structured to engage the plurality of splines 34c on brake rotor attachment unit 34 of hub 12 so that rotor attachment boss 28 can be nonrotatably attached to hub 12. Rotor attachment boss 28 further comprises a rotor connector 28d that extends radially outwardly from base member 28a and defines a plurality of equally spaced rotor attachment arms 28h. Each rotor attachment arm 28h preferably includes at least one axially extending protruding portion 28e that is press fit into a corresponding opening 28f for purposes discussed below. In this embodiment, rotor attachment boss 28 comprises aluminum.

Figure 7:
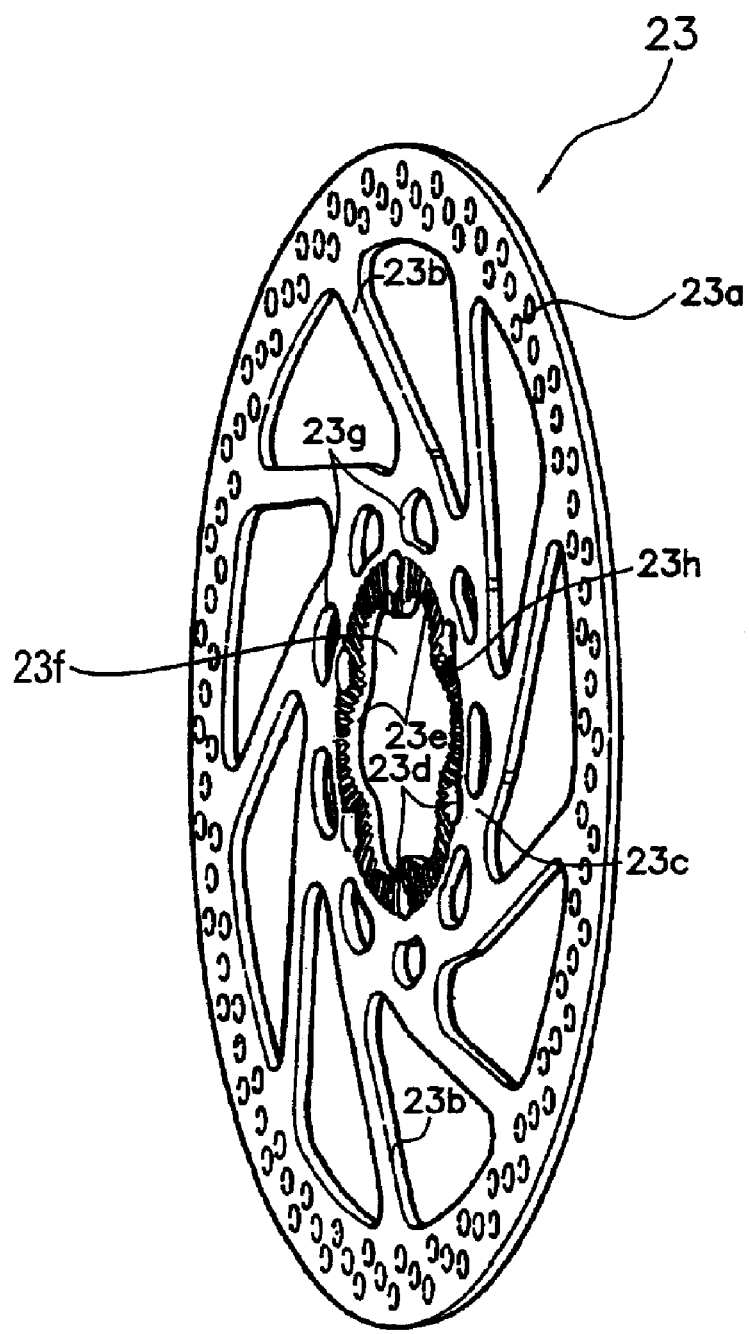

As shown in FIG. 7, disk brake rotor 23 comprises a braking ring 23a formed with a plurality of openings, a plurality of (e.g., eight) connecting arms 23b disposed circumferentially equidistant and extending radially inwardly from braking ring 23a, and an inner attachment unit 23c connected tangentially to the inner ends of the plurality of connecting arms 23b so that the plurality of connecting arms 23b form a plurality of triangular openings. In this embodiment, braking ring 23a, the plurality of connecting arms 23b and inner attachment unit 23c are one piece. Disk brake rotor 23 preferably is made from stainless steel or some other appropriate material, usually with a specific gravity greater than that of the material forming rotor attachment boss 28, that can withstand braking forces.

Inner attachment unit 23c defines a central opening 23f and comprises a plurality of circumferentially equidistant connection notches 23e, a plurality of circumferentially equidistant openings 23g, and a plurality of circumferentially equidistant connection openings 23d. Preferably, there is one connection opening 23d per protruding portion 28e in rotor attachment boss 28. Each protruding portion 28e in rotor attachment boss 28 engages a corresponding connection opening 23d in inner attachment unit 23c so that disk brake rotor 23 may be nonrotatably attached to rotor attachment boss 28. The axial length of each protruding portion 28e preferably is less than or equal to the thickness of inner attachment unit 23c. Inner attachment unit 23c also includes a rotation inhibiting structure 23h in the form of serrations, ridges, etc. that extends circumferentially around inner attachment unit 23c in close proximity (e.g., directly adjacent) to central opening 23f.

Figure 8:
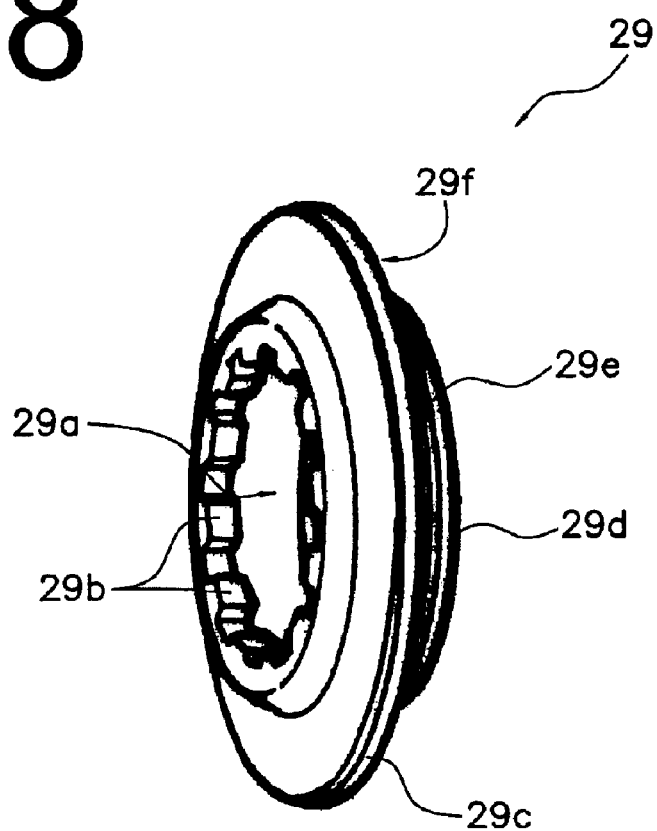

As shown in FIG. 8, securing ring 29 comprises an annular flange 29c and a tubular portion 29d that extends axially from the inner peripheral surface of flange 29c. Flange 29c includes a central opening 29a defining a plurality of female splines 29b that are structured to engage an assembly tool (not shown). Tubular portion 29d includes a male threaded portion 29e structured to engage the female threaded portion 34d on brake rotor attachment unit 34 of hub 12. Thus, when securing ring 29 is screwed onto brake rotor attachment unit 34, the side face of flange 29c presses against inner attachment unit 23c of disk brake rotor 23, which presses against flange 34b of brake rotor attachment unit 34 of hub 12. In this embodiment, a fastener rotation inhibiting unit 29f in the form of serrations, ridges, etc. extends circumferentially around the face of flange 29c so as to engage rotation inhibiting structure 23h on inner attachment unit 23c when securing ring 29 is screwed onto brake rotor attachment unit 34.

Figure 9:
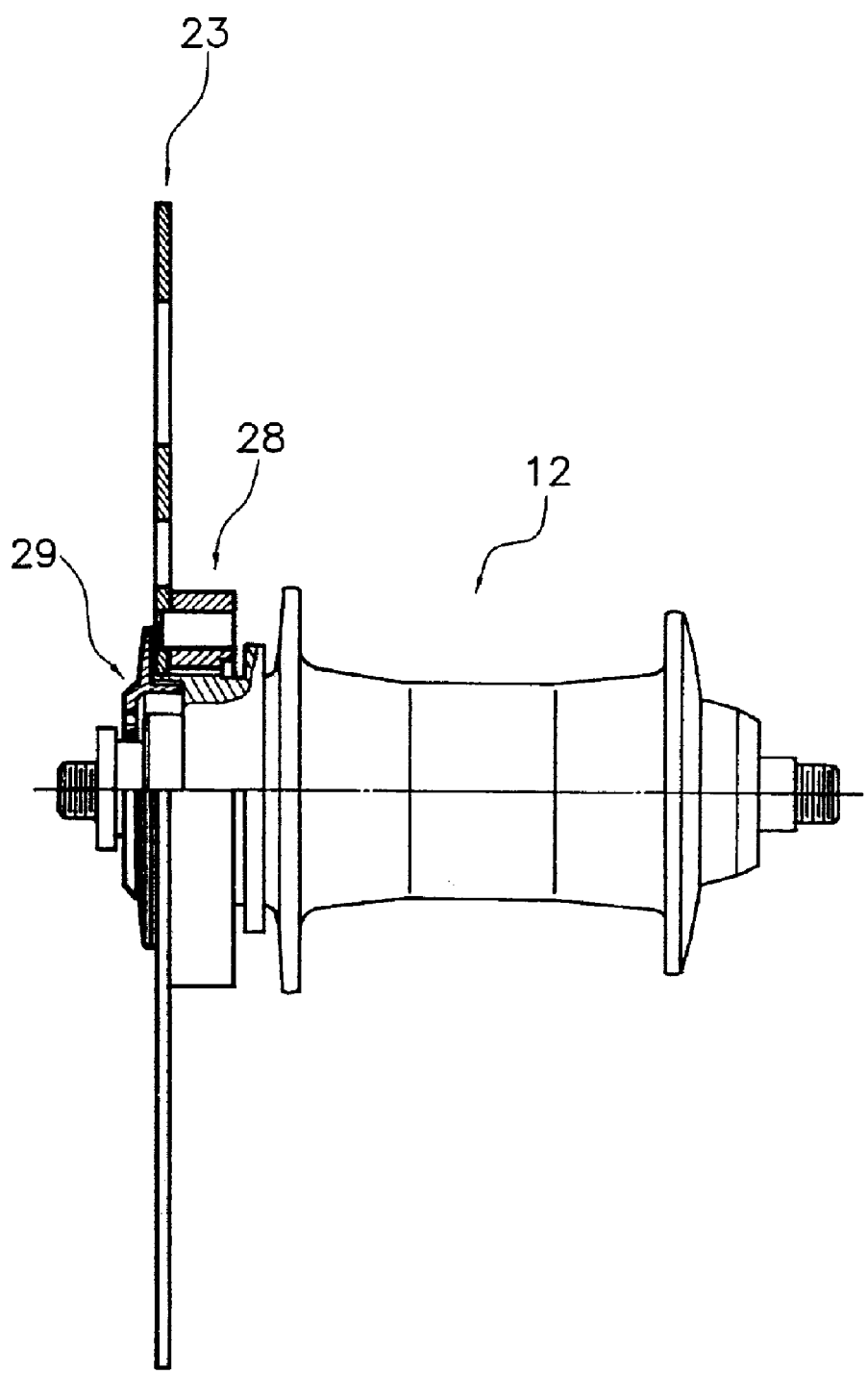

FIG. 9 is a view of disk brake rotor assembly 8 attached to hub 12. During assembly, rotor attachment boss 28 initially is mounted to brake rotor attachment unit 34 of hub 12 by engaging the male splines 34c on brake rotor attachment unit 34 with the female splines 28c on rotor attachment boss 28. Then, disk brake rotor 23 is placed on rotor attachment boss 28 by engaging protruding portions 28e of rotor attachment boss 28 with the corresponding connection openings 23d in disk brake rotor 23. Finally, securing ring 29 is screwed onto the female threaded portion 34d of brake rotor attachment unit 34 of hub 12 to tightly secure disk brake rotor assembly 8 to hub 12. The disk brake rotor 23, sandwiched between rotor attachment boss 28 and securing ring 29 to form a strong connection, is thereby secured in a non-rotatable state to the brake rotor attachment unit 34 of hub 12. The nonrotatable connection between disk brake rotor 23 and rotor attachment boss 28 prevents loosening of securing ring 29 during normal operation. Rotation inhibiting unit 23h on disk brake rotor 23 further inhibits loosening of securing ring 29 due to long years of use, vibration, etc., and the effect is even greater when rotation inhibiting unit 29f is provided on securing ring 29 to provide a serration-to-serration locking contact.

Figure 10:
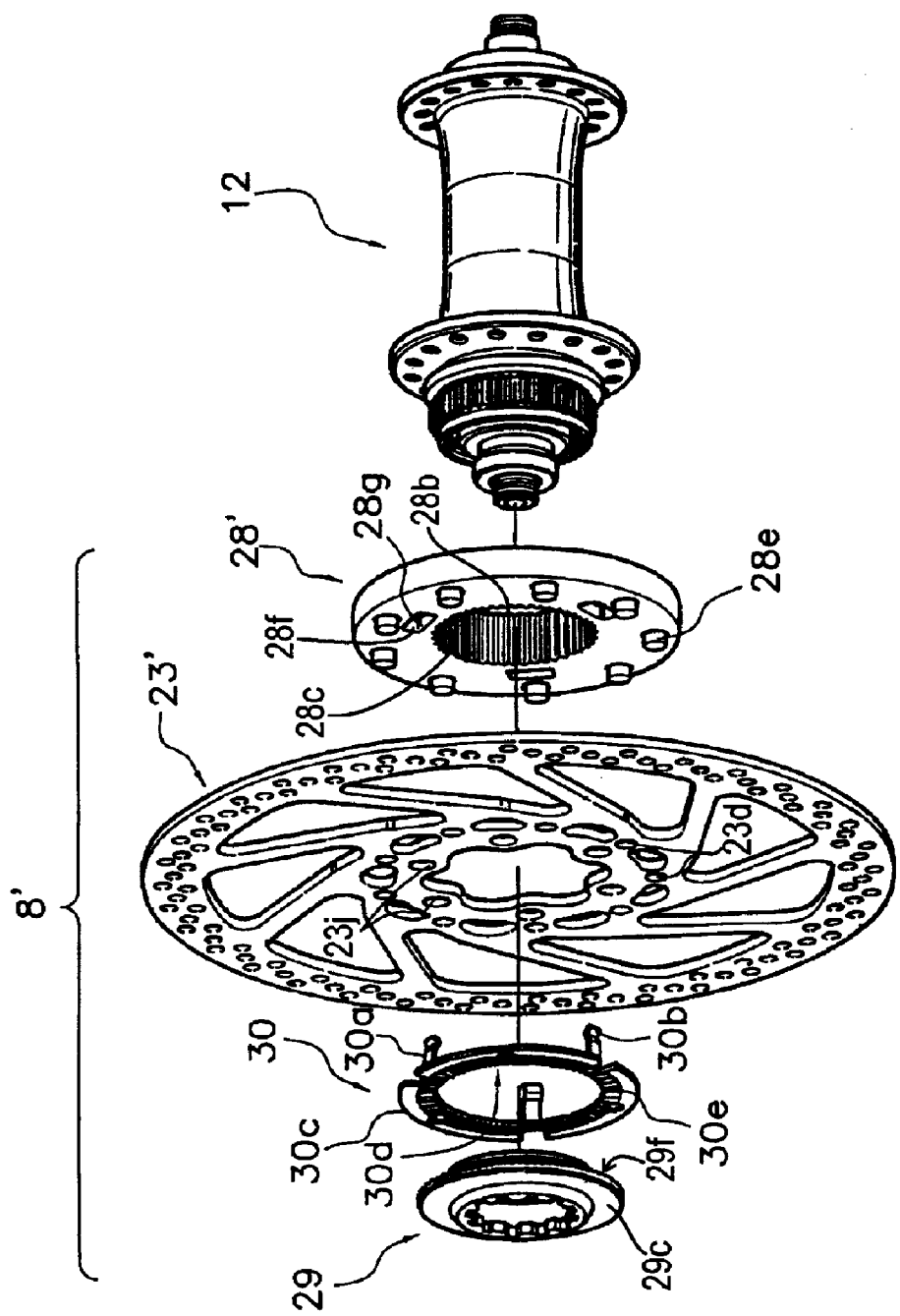

While the above is a description of various embodiments of inventive features, further modifications may be employed without departing from the spirit and scope of the present invention. For example, FIG. 10 is an exploded view of further embodiments of disk brake components associated with wheel hub 12. In this embodiment, a disk brake rotor assembly 8' comprises a disk brake rotor 23', a rotor attachment boss 28', a securing ring 29 and a rotor retaining member 30. Rotor attachment boss 28' again includes protruding portions 28e that engage connection openings 23d in brake disk rotor 23, and securing ring 29 screws into brake rotor attachment unit 34 of hub 12 as in the first embodiment. However, in this embodiment a rotation inhibiting unit 23h is not provided on disk brake rotor 23.

Rotor retaining member 30 comprises an annular disk-shaped main body 30c, a rotation inhibiting unit 30e in the form of ridges, serrations, etc. that face flange 29c of securing ring 29 (which may or may not have a corresponding fastener rotation inhibiting unit 29f as in the first embodiment), and a plurality of (e.g., three) elastically deformable latching members 30a extending perpendicularly from a lateral side face of main body 30c. Each latching member 30a includes a radially inwardly curved protruding portion 30b at the tip thereof. Each protruding portion 30b is structured to be inserted through an insertion opening 23j in disk brake rotor 23 and engage a step 28g in a corresponding insertion opening 28f of rotor attachment boss 28 when rotor retaining member 30 is attached to rotor attachment boss 28'.

In this embodiment, rotor attachment boss 28' initially is mounted to brake rotor attachment unit 34 of hub 12 by engaging the female splines 28c on rotor attachment boss 28' with the male splines 34c on brake rotor attachment unit 34 as in the first embodiment. Then, disk brake rotor 23' is placed on rotor attachment boss 28' by engaging protruding portions 28e of rotor attachment boss 28 with the corresponding connection openings 23d in disk brake rotor 23. At this time, insertion openings 23j in disk brake rotor 23' align with insertion openings 28f in rotor attachment boss 28'.

Latching members 30a of rotor retaining member 30 then are inserted through insertion openings 23j in disk brake rotor 23' and into insertion openings 28f in rotor attachment boss 28'. Latching members 30a deflect radially outwardly until projecting portions 30b move radially inwardly to latch onto their corresponding steps 28g in insertion openings 28f. As a result, disk brake rotor 23' is retained to rotor attachment boss 28' simply by a single touch pressing operation on rotor retaining member 30.

Finally, securing ring 29 is screwed onto the threaded portion 34d of brake rotor attachment unit 34 of hub 12 to tightly secure disk brake rotor assembly 8 to hub 12. The disk brake rotor 23', sandwiched between rotor attachment boss 28' and rotor retaining member 30 (and securing ring 29) to form a strong connection, is thereby secured in a non-rotatable state to the brake rotor attachment unit 34 of hub 12.

Once again, the nonrotatable connection between disk brake rotor 23' and rotor attachment boss 28' prevents loosening of securing ring 29 during normal operation. Rotation inhibiting unit 30e on rotor retaining member 30 further inhibits loosening of fastener 29 due to long years of use, vibration, etc., and the effect is even greater when a rotation inhibiting unit 29f is provided on securing ring 29 to provide a serration-to-serration locking contact.

Disk brake rotor 23' need not be sandwiched between rotor retaining member 30 and brake rotor attachment unit 34. Instead, rotor retaining member 30 could be inserted from the right side through insertion openings 28f in rotor attachment boss 28', through insertion openings 23d in disk brake rotor 23', and latch onto the side surface of disk brake rotor 23'.

Figure 11:
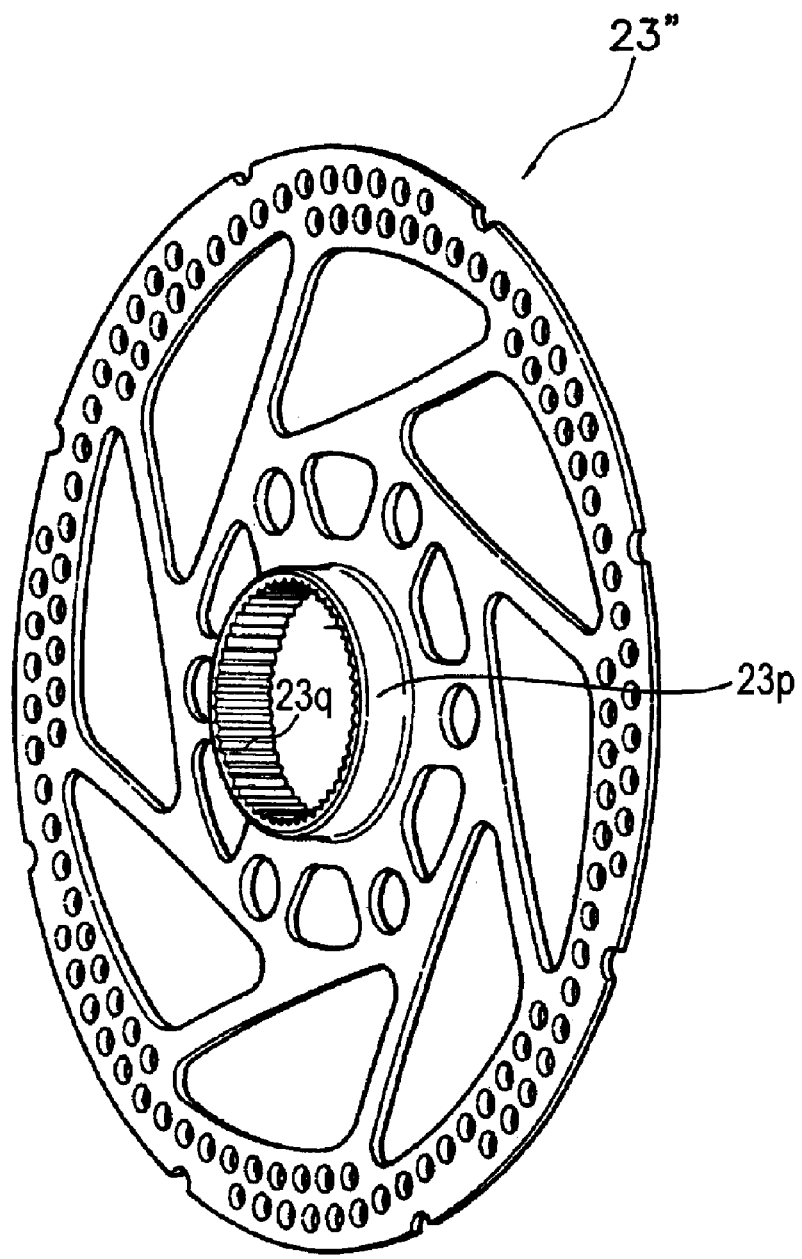
Figure 12:
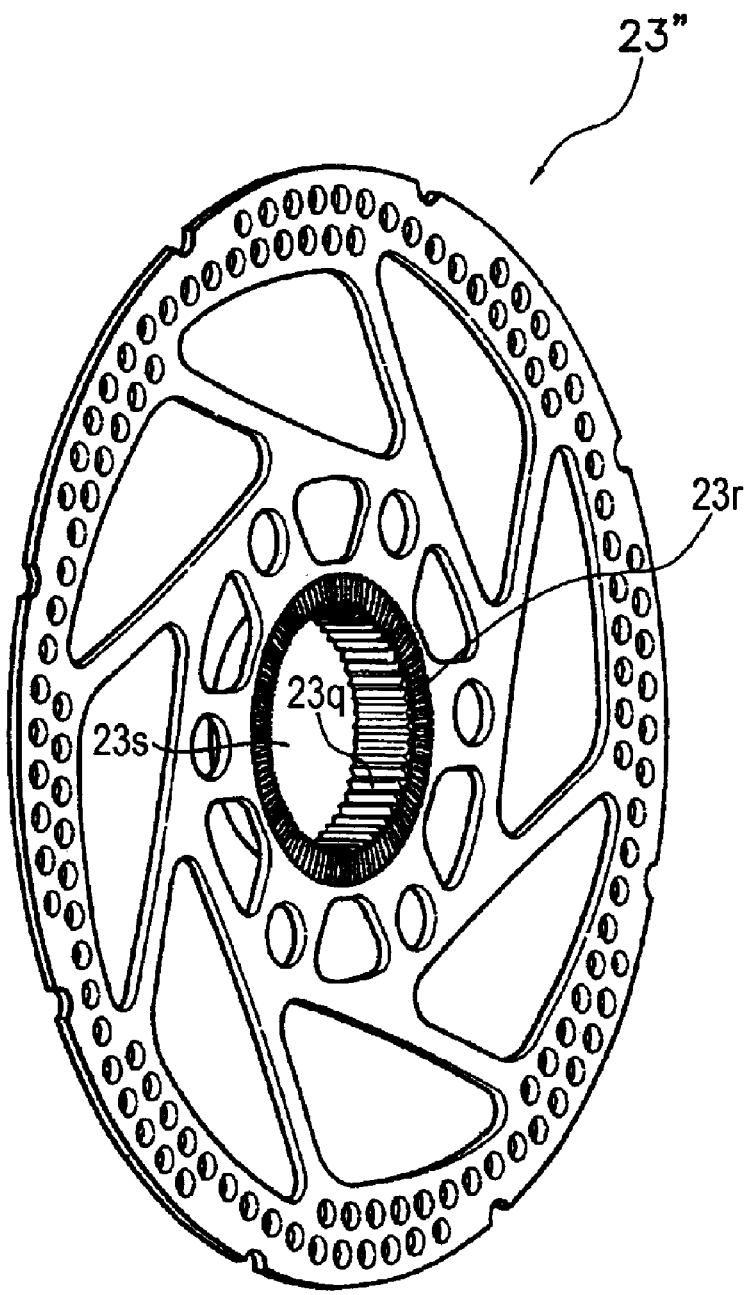

While the above embodiments show a separate rotor attachment boss 28 that nonrotatably couples disk brake rotor 23 to hub 12, FIGS. 11 and 12 show an embodiment wherein a tubular rotor attachment boss 23p is formed integrally as part of a disk brake rotor 23". Rotor attachment boss 23p includes female splines 23q structured to engage the plurality of male splines 34c on brake rotor attachment unit 34 of hub 12 so that disk brake rotor 23" can be nonrotatably attached to hub 12. Disk brake rotor 23" also includes a rotation inhibiting structure 23r in the form of serrations, ridges, etc. that extends circumferentially around the radially inner portion of disk brake rotor 23" in close proximity (e.g., directly adjacent) to central a opening 23s defined by rotor attachment boss 23p. Rotation inhibiting structure 23r contacts securing ring 29 (with or without a fastener rotation inhibiting structure 29f) as in the first embodiment.

The size, shape, location or orientation of the various components may be changed as desired. Components that are shown directly connected or contacting each other may have intermediate structures disposed between them. The teachings herein could be applied to one or both of hubs 12 and 12'. Those features that are designated as preferable certainly are not necessary. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for fixing a bicycle disk brake rotor to a bicycle wheel hub, wherein the hub has a threaded surface, wherein the apparatus comprises:
    an adapter structured to be nonrotatably coupled to the hub;
    a rotor retaining member structured to axially retain the disk brake rotor to the adapter;
    a fastener structured to screw onto the threaded surface of the hub so that the rotor retaining member is disposed between the fastener and the hub; and
    a rotation inhibiting structure that inhibits relative rotation between the fastener and the rotor retaining member.

2. The apparatus according to claim 1 wherein the rotation inhibiting structure comprises serrations.

3. The apparatus according to claim 1 wherein the rotation inhibiting structure is formed on a side surface of the rotor retaining member.

4. The apparatus according to claim 3 wherein the rotation inhibiting structure comprises serrations.

5. The apparatus according to claim 1 wherein the rotor retaining member is structured to be nonrotatably coupled to the adapter.

6. The apparatus according to claim 5 wherein one of the rotor retaining member and the adapter includes a projection that engages an opening in the other one of the rotor retaining member and the adapter to nonrotatably couple the rotor retaining member to the adapter.

7. The apparatus according to claim 1 wherein the adapter is structured to be nonrotatably coupled to the disk brake rotor.

8. The apparatus according to claim 7 wherein the adapter includes one of a projection and an opening structured to engage a corresponding other one of a projection and an opening in the disk brake rotor to nonrotatably coupled the disk brake rotor to the adapter.

9. The apparatus according to claim 1 wherein the rotor retaining member axially retains the disk brake rotor to the adapter independently of the fastener.

* * * * *